E. T. FARMER.
FLOUR SIFTER.
APPLICATION FILED DEC. 21, 1909. RENEWED DEC. 31, 1910.

989,956.

Patented Apr. 18, 1911.

Witnesses
John H. Crawford

Inventor
Edwin T. Farmer,
By Victor J. Evans
Attorney

UNITED STATES PATENT OFFICE.

EDWIN T. FARMER, OF CARTHAGE, MISSOURI.

FLOUR-SIFTER.

989,956.   Specification of Letters Patent.   Patented Apr. 18, 1911.

Application filed December 21, 1909, Serial No. 534,332. Renewed December 31, 1910. Serial No. 600,285.

*To all whom it may concern:*

Be it known that I, EDWIN T. FARMER, a citizen of the United States, residing at Carthage, in the county of Jasper and State of Missouri, have invented new and useful Improvements in Flour-Sifters, of which the following is a specification.

This invention relates to improvements in devices for sifting flour, meal and the like, of that class in which a suitable receptacle is provided with a screen at or near its lower part and an oscillatory agitator passing over the face of the screen, and the object of the invention is to provide a device of this character which is simple in construction, comparatively cheap to manufacture, and which may be held and operated by one hand of the user.

With the above, and other objects in view, which will be more apparent as the description progresses, the invention resides in the novel construction and arrangement of parts hereinafter fully described and claimed.

Figure 1:
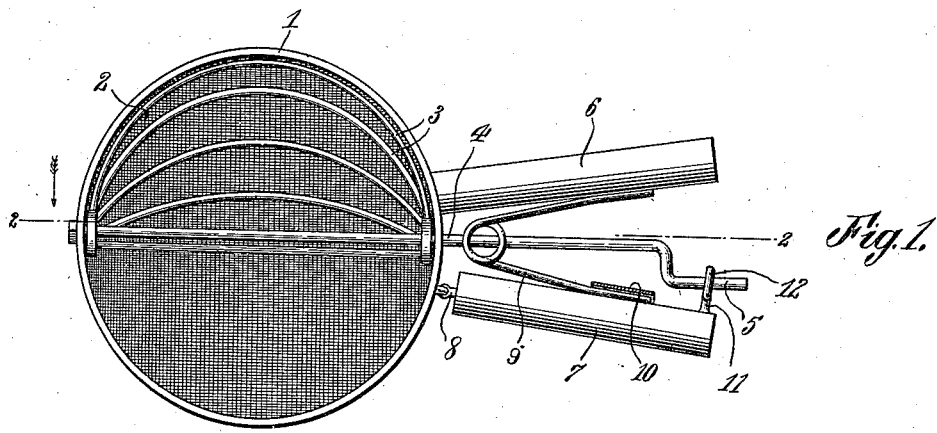
Figure 2:
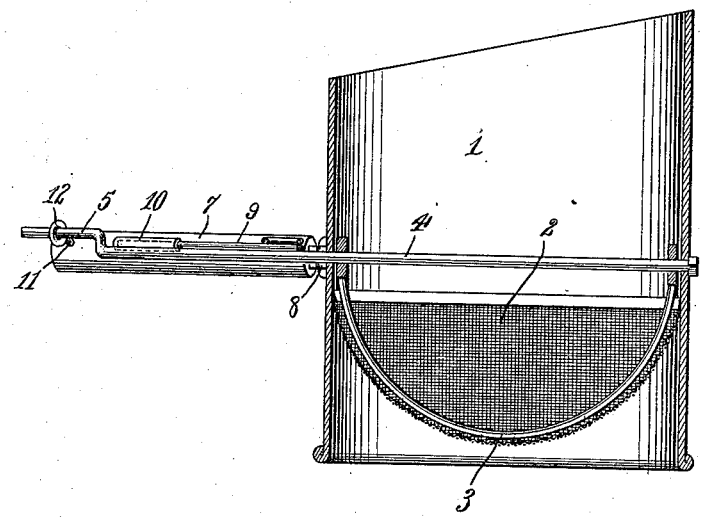

In the accompanying drawings there has been illustrated and described a simple embodiment of the improvement, and in which drawings, Figure 1 is a top plan view of the device. Fig. 2 is a central longitudinal sectional view of the same taken upon the line 2—2 of Fig. 1.

In the accompanying drawings the numeral 1 designates the body of the sifter which comprises a cross sectionally cylindrical member open at both its top and bottom and the numeral 2 designates the sieve which is constructed of suitable wire and is preferably of a hemispherical shape. The sieve is attached to the receptacle 1 in any desired or preferred manner and the said sieve and receptacle are illustrated only to disclose the operative mechanism for the agitator or beater 3. The beater 3 comprises a plurality of arcuate wire members having their central portions spaced apart and their ends connected with suitable hubs, and connected with the said hubs in any suitable manner is a longitudinally extending shaft 4. The shaft 4 is adapted to bear within suitable openings provided in diametrically opposite sides of the receptacle 1 and the said shaft has one of its ends extending a suitable distance beyond the said receptacle and provided with an offset arm designated by the numeral 5.

The numeral 6 designates one of the handles for the receptacle. This handle 6 is secured upon the receptacle 1 in any desired or preferred manner. The numeral 7 designates the opposite or operating handle of the device. This handle 7 is hingedly connected with the receptacle 1 as at 8 and positioned between the handles 6 and 7 is a leaf spring 9. The leaf or double-arm spring 9 has one of its arms securely connected with the handle 6, while its opposite arm is free to slide within a suitable bearing 10 provided upon the inner face of the handle 7. The outer extremity of the handle 7 is provided with an offset member 11 having an eye 12 and the said eye is adapted to receive the end of the offset 5 provided upon the shaft 4. In practice it has been found preferable to construct the member 11 of suitable resilient material.

In operating the device, it will be noted that it is merely necessary for the operator to grasp both of the handles 6 and 7 and by a pressure of the fingers toward the palm of the hand the handle 7 will be swung toward the handle 6, thus oscillating the shaft 7 and causing the agitator 3 to sweep across the face of the reticulated bottom 2. As pressure is released it will be noted that the spring 9 will readily return the handle 7 to its initial position.

From the above description, taken in connection with the accompanying drawing it will be noted that I have provided an extremely simple and thoroughly effective device for the purpose intended, and while I have illustrated and described the preferred embodiment of the improvement, as it now appears to me, minor details of construction within the scope of the following claim may be resorted to if desired.

Having thus fully described the invention, what I claim as new is:—

In combination with a receptacle having a reticulated bottom and an agitator for the reticulated bottom, of a shaft for the agitator, said shaft having one of its ends projecting through the receptacle and its extremity offset, a stationary handle for the receptacle positioned adjacent one side of the extension of the shaft, a hinged handle for the receptacle positioned adjacent the opposite side of the shaft, a two-arm spring, one of the arms of said spring connected with the stationary handle, the hinged handle being provided with a bearing adapted for the reception of the second arm of the spring, and the hinged arm having its extremity provided with an offset having an eye for the reception of the offset of the shaft.

In testimony whereof I affix my signature in presence of two witnesses.

EDWIN T. FARMER.

Witnesses:
   GEO. W. CAMPBELL,
   W. T. MILLER.

---

Copies of this patent may be obtained for five cents each, by addressing the "Commissioner of Patents, Washington, D. C."